(12) United States Patent
Delzenne (10) Patent No.: US 12,401,198 B2
(45) Date of Patent: Aug. 26, 2025

(54) ARRANGEMENT HAVING A DC TRANSMISSION LINK OR DC TRANSMISSION GRID AND METHOD FOR THE OPERATION THEREOF

(71) Applicant: Siemens Energy Global GmbH & Co. KG, Munich (DE)

(72) Inventor: Maxime Delzenne, Erfurt (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 269 days.

(21) Appl. No.: 18/044,093

(22) PCT Filed: Sep. 4, 2020

(86) PCT No.: PCT/EP2020/074702
§ 371 (c)(1),
(2) Date: Mar. 6, 2023

(87) PCT Pub. No.: WO2022/048763
PCT Pub. Date: Mar. 10, 2022

(65) Prior Publication Data
US 2023/0327451 A1 Oct. 12, 2023

(51) Int. Cl.
*H02J 3/36* (2006.01)
(52) U.S. Cl.
CPC ..................... *H02J 3/36* (2013.01)
(58) Field of Classification Search
CPC .......................................... H02J 3/36
See application file for complete search history.

(56) References Cited

U.S. PATENT DOCUMENTS 5,446,643 A * 8/1995 McMurray .............. H02M 7/49
363/43
2020/0313438 A1 10/2020 Pfeifer et al.

FOREIGN PATENT DOCUMENTS

CA 1183895 A 3/1985
CN 107681680 A * 2/2018 ............... H02J 3/16
(Continued)

OTHER PUBLICATIONS

Atiq Ur Rehman; Changyong Zhao; Coordinated Control Strategy for Transient Performance Improvement of LCC based HVDC Transmission System with STATCOM under Weak AC grid; IEEE Conference on Energy Internet and Energy System Integration; Oct. 22, 2018; 6 pages. (Year: 2018).*

*Primary Examiner* — Harry R Behm
(74) *Attorney, Agent, or Firm* — Laurence A. Greenberg; Werner H. Stemer; Ralph E. Locher (57) ABSTRACT

A method operates an arrangement having a DC transmission link or a DC transmission grid to which at least two converters each having an AC voltage side and a DC voltage side are connected. A grid stabilization device is connected to the AC voltage side of one of the converters, subsequently referred to as near converter. The grid stabilization device has for the purpose of grid stabilization an energy store for the buffer storage of energy and/or an energy consumer for the consumption of electrical energy, and the grid stabilization device is isolated on the grid side from at least one other of the at least two converters, subsequently referred to as a remote converter, by way of the near converter. The grid stabilization device is actuated by at least one control signal that is produced and transmitted to the grid stabilization device by the near or the remote converter.

15 Claims, 10 Drawing Sheets

(56) References Cited

FOREIGN PATENT DOCUMENTS

| CN | 108110783 A | * | 6/2018 | ................ | H02J 3/16 |
| DE | 102017217505 A1 | | 4/2019 | | |
| SE | 1851656 A1 | | 6/2020 | | |
| WO | WO-2020173549 A1 | * | 2/2020 | ............ | H02J 3/1842 |

* cited by examiner

ARRANGEMENT HAVING A DC TRANSMISSION LINK OR DC TRANSMISSION GRID AND METHOD FOR THE OPERATION THEREOF

FIELD AND BACKGROUND OF THE INVENTION

The invention relates to a method for operating an arrangement having at least one DC transmission link or at least one DC transmission grid to which at least two converters, each having an AC voltage side and a DC voltage side, are connected. DC transmission links are generally known in the area of power transmission technology and, in the high-voltage range, are referred to as HVDC transmission links. DC transmission links are used, for example, in order to transmit power from so-called "offshore" wind farms to land.

SUMMARY OF THE INVENTION

The invention is based on the object of providing a method for operating an arrangement of the described type, in which, in the event of operational changes on the DC transmission link or the DC transmission grid, grid instabilities on the AC voltage side of at least one of the converters can be reduced.

This object is achieved according to the invention by a method having the features as claimed in the independent claim. Advantageous embodiments of the method according to the invention are described in dependent claims.

It is therefore provided according to the invention that a grid stabilization device is connected indirectly or directly to the AC voltage side of one of the converters, referred to in the following as near converter, the grid stabilization device having for the purpose of grid stabilization an energy store for the temporary storage of energy and/or an energy consumer for consuming electrical energy, and the grid stabilization device is separated on the grid side from at least one other of the at least two converters, referred to in the following as remote converter, by way of the near converter, and the grid stabilization device is activated by at least one control signal, which is generated and transmitted to the grid stabilization device by the near or the remote converter.

An essential advantage of the method according to the invention is that, with the aid of the converter-side control signal generated according to the invention, in the event of operational changes, a targeted activation of the grid stabilization device located on the AC voltage side can be carried out very quickly and, thus, a grid stabilization of the AC voltage grid connected to the AC voltage side can be very quickly achieved. The grid stabilization device can namely become active already, advantageously, even before operational changes on the DC transmission link or the DC transmission grid take effect on the AC voltage grid, since the information regarding operational changes is generally already present in the converters even before the AC voltage grid has been apparently affected and grid instabilities are actually detectable.

It is advantageous when, in the event of an increase in the power supplied by the remote converter or the direct current supplied by the remote converter into the DC transmission link or the DC transmission grid, the remote converter transmits a control signal to the grid stabilization device, with which the increase is indicated and/or the increase is quantified, and the grid stabilization device, after having received this control signal, draws power from the AC voltage grid connected to the near converter.

In the event of a decrease in the power supplied by the remote converter or in the direct current supplied by the remote converter into the DC transmission link or the DC transmission network, the remote converter preferably transmits a control signal to the grid stabilization device, with which the decrease is indicated and/or the decrease is quantified. The grid stabilization device, after having received this control signal, preferably supplies power into the AC voltage grid connected to the near converter.

Alternatively or additionally, it can be advantageously provided that, in the event of an increase in the power supplied by the remote converter or the direct current supplied by the remote converter into the DC voltage link or the DC voltage grid, the near converter transmits a control signal to the grid stabilization device, with which the increase is indicated and/or the increase is quantified by providing an absolute increase value indicating the increase and/or by indicating a power to be taken up by the grid stabilization device, and the grid stabilization device, after having received this control signal, draws power from the AC voltage grid connected to the near converter.

Therefore, it is also considered to be advantageous that, in the event of a decrease in the power supplied by the remote converter or the direct current supplied by the remote converter into the DC voltage link or the DC voltage grid, the near converter transmits a control signal to the grid stabilization device, with which the decrease is indicated and/or the decrease is quantified by providing an absolute decrease value indicating the decrease and/or by indicating a power to be given off by the grid stabilization device, and the grid stabilization device, after having received this control signal, supplies power into the AC voltage grid connected to the near converter.

The near converter preferably includes at least one energy store. In an embodiment of this type, it is advantageous when the control signal, which the near converter transmits to the grid stabilization device, depends at least also on the energy stored in the at least one energy store and/or on the change, with respect to time, in the energy stored in the energy store.

It is advantageous when the grid stabilization device counteracts the change in energy of the energy stored in the near converter and, in fact, by supplying energy into or drawing energy from the AC voltage grid connected to the near converter.

In addition, it is advantageous when the grid stabilization device transmits a feedback signal to the near converter, which indicates the reactive power consumption of the grid stabilization device, and the near converter supplies the reactive power consumption indicated in the feedback signal into the AC voltage grid connected to the near converter and, thus, makes the required reactive power available to the grid stabilization device via the AC voltage network.

In one embodiment that is considered to be particularly advantageous, it is provided that the grid stabilization device has a control unit and a rectifier circuit that includes at least two thyristors, the rectifier circuit being connected with a grid-side connection side to the AC voltage grid and with an internal connection side to an electrical energy store and/or an energy consumer of the grid stabilization device, and the control unit switches on at least one of the thyristors of the rectifier circuit and leaves at least one of the other thyristors of the rectifier circuit switched off in order to draw power from the AC voltage grid or to supply power into the AC voltage grid. Thyristors are highly advantageous in comparison to other switching elements such as, for example, IGBT's, due to their comparatively low power loss.

The invention also relates to an arrangement that includes at least one DC transmission link or at least one DC transmission grid to which at least two converters, each having an AC voltage side and a DC voltage side, are connected. According to the invention, it is provided with respect to an arrangement of this type that a grid stabilization device is connected indirectly or directly to the AC voltage side of one of the converters, referred to in the following as near converter, the grid stabilization device having for the purpose of grid stabilization an energy store for the temporary storage of energy and/or an energy consumer for consuming electrical energy, and the grid stabilization device is separated on the grid side from at least one other of the at least two converters, referred to in the following as remote converter, by way of the near converter, and the grid stabilization device is controlled by at least one control signal, which is generated and transmitted to the grid stabilization device by the near or the remote converter.

With respect to the advantages of the arrangement according to the invention and advantageous embodiments of the arrangement according to the invention, reference is made to the comments presented above in connection with the method according to the invention and the advantageous embodiments of the invention.

With respect to the arrangement, it is advantageous when the grid stabilization device includes a control unit and a rectifier circuit that includes at least two thyristors, the rectifier circuit being connected with a grid-side connection side to the AC voltage grid and with an internal connection side to an electrical energy store and/or an energy consumer of the grid stabilization device.

The control unit is preferably designed in such a way that the control unit carries out the control of the grid stabilization device by utilizing the converter-side control signal and switches on at least one of the thyristors of the rectifier circuit and leaves at least one of the other thyristors of the rectifier circuit switched off in order to draw power from the AC voltage grid or to supply power into the AC voltage grid.

Preferably at least one transformer is connected between the grid-side connection side of the rectifier circuit and the AC voltage grid.

The or at least one of the transformer(s) preferably has a three-phase connection with neutral earthing and a three-phase connection in a Delta configuration.

The rectifier circuit preferably includes at least two three-phase connections. One of the three-phase connections of the rectifier circuit is preferably connected to a three-phase connection with neutral earthing of one of the transformers and another of the three-phase connections of the rectifier circuit is connected to a three-phase connection in a Delta configuration thereof or of another transformer.

The invention is explained in the following in greater detail with reference to exemplary embodiments. In the drawings, by way of example.

BRIEF DESCRIPTION OF THE FIGURES

DETAILED DESCRIPTION OF THE INVENTION

In the figures, the same reference signs are always used for identical or comparable components for the sake of clarity.

Figure 1:
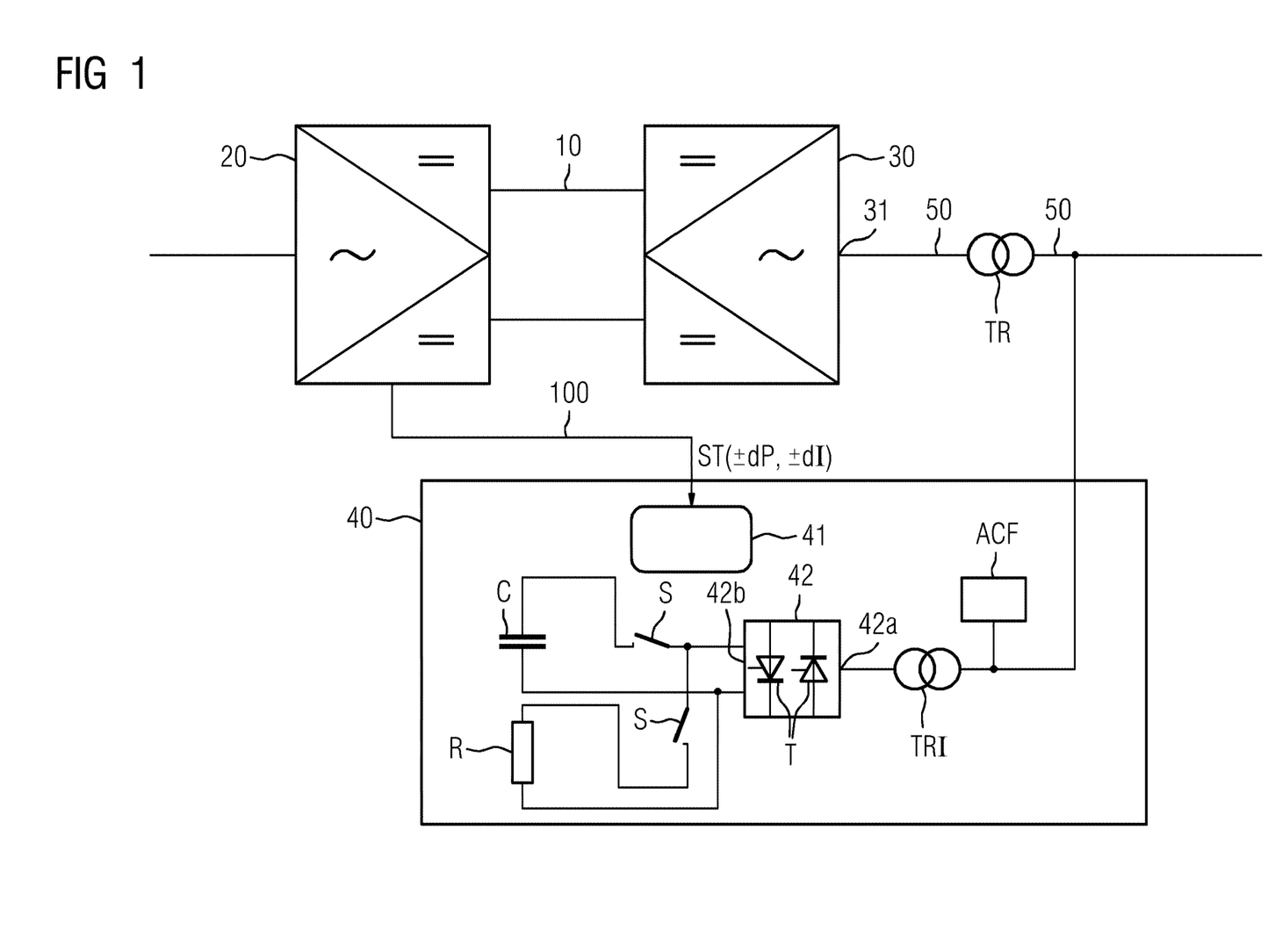
FIGS. 1-5 show exemplary embodiments of arrangements according to the invention, on the basis of which exemplary embodiments of the method according to the invention are also explained.

FIG. 1 shows an exemplary embodiment of an arrangement in which a converter 20 shown on the left in FIG. 1 and a converter 30 shown on the right in FIG. 1 are connected to a DC transmission link 10. A grid stabilization device 40 is connected to the AC voltage side 31 of the converter 30 shown on the right in FIG. 1, the grid stabilization device 40 being electrically separated from the converter 20 shown on the left in FIG. 1, which is remote from the grid stabilization device 40, referred to in the following as remote converter 20, by way of the right converter 30, which is close to the grid stabilization device 40, referred to in the following as close converter 30.

The grid stabilization device 40 includes a control unit 41, a rectifier circuit 42, which has two or more thyristors T and is connected with a grid-side connection side 42a to the AC voltage side 31 of the close converter 30 or to an AC voltage grid 50 connected thereto. With an internal connection side 42b, the rectifier circuit 42 is connected to one or more electrical energy store(s) C and to one or more energy consumer(s) R. Further switches S, which can be opened or closed by the control unit 41, can be provided for selecting an energy storage mode or an energy consumption mode.

The control unit 41 switches on at least one of the thyristors T of the rectifier circuit 42 and switches off at least one of the other thyristors T of the rectifier circuit 42 in order to draw power from the AC voltage grid 50 or to supply power to the AC voltage grid 50.

The connection of the rectifier circuit 42 to the AC voltage side 31 of the near converter 30 can be a direct connection or an indirect connection, as shown in FIG. 1; in FIG. 1, by way of example, an internal transformer TRI and a filter ACF of the grid stabilization device 40 and a grid-side transformer TR are interposed.

Advantageous embodiments of the grid stabilization device 40 according to FIG. 1 are explained in greater detail further below in connection with FIGS. 6 through 10.

In the exemplary embodiment according to FIG. 1, the control unit 41 of the grid stabilization device 40 is connected via a communication line 100 to the remote converter 20, from which the control unit 41 receives a control signal ST via the communication line 100. The remote converter 20 is designed in such a way that the remote converter 20 communicates changes in the operating situation of the remote converter 20 to the control unit 41 of the grid stabilization device 40, so that the control unit 41 can implement suitable measures with respect to the AC voltage grid 50 for stabilizing the AC voltage grid 50, for example, when fluctuations occur in the power transmission via the DC transmission link 10 due to a changed supply behavior of the remote converter 20.

In the event of an increase +dP or +dI in the effective power P supplied by the remote converter 20 or in the direct current I supplied by the remote converter into the DC transmission link 10, a control signal ST(+dP, +dI) is transmitted to the grid stabilization device 40, with which the increase is indicated and the increase is quantified. In this case, the grid stabilization device 40, after having received this control signal ST(+dP, +dI), draws power from the AC voltage grid 50 connected to the near converter 30 for the purpose of grid stabilization.

In the event of a decrease −dP or −dI in the effective power supplied by the remote converter or in the direct current supplied by the remote converter into the DC transmission link 10, the remote converter 20 transmits a control signal ST(−dP, −dI) to the grid stabilization device, with which the decrease is indicated and the decrease is quantified. In this case, the grid stabilization device 40, after having received the control signal ST(−dP, −dI), preferably supplies power into the AC voltage grid 50 connected to the near converter 30 for the purpose of grid stabilization.

Figure 2:
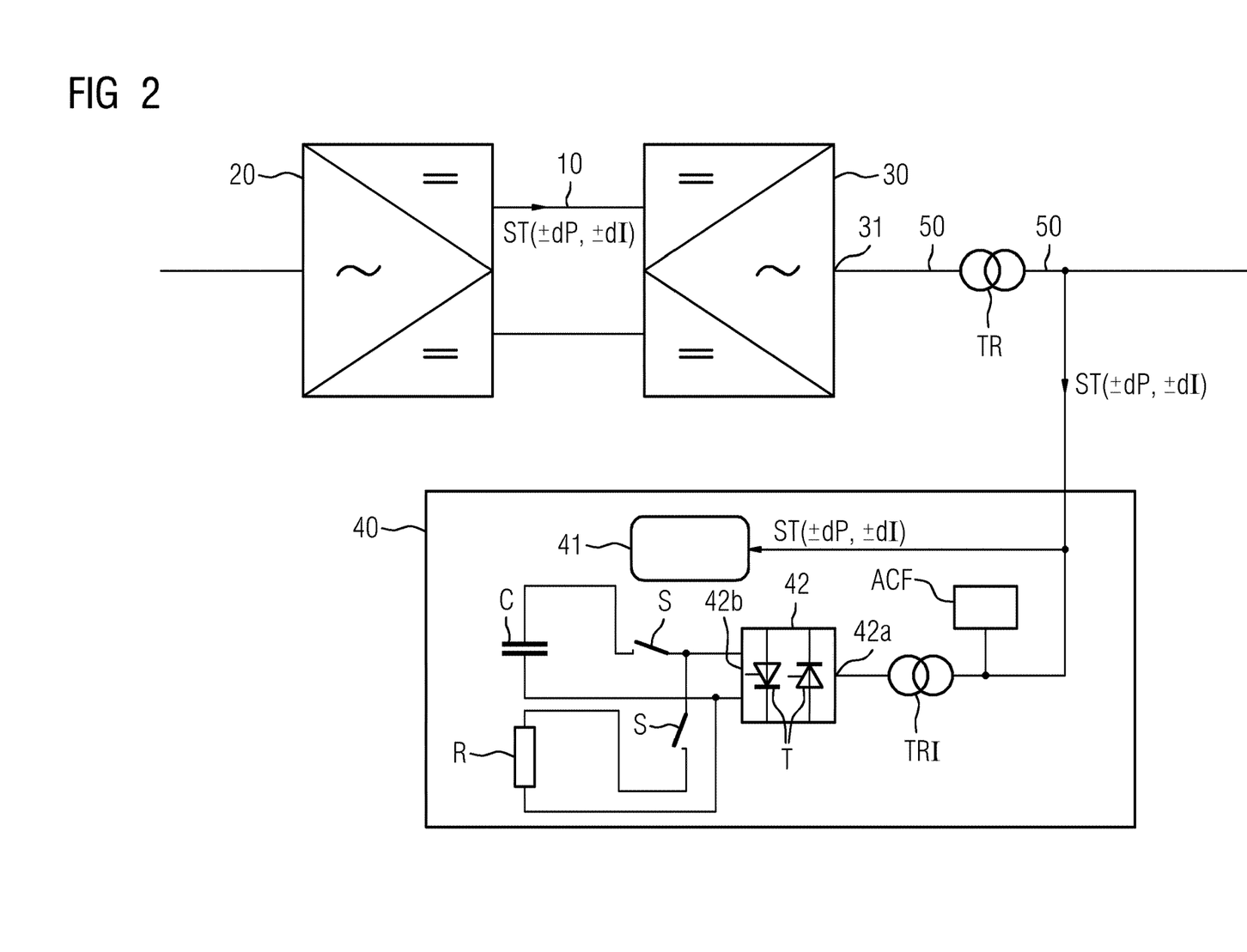

FIG. 2 shows an embodiment variant of the arrangement according to FIG. 1. In the embodiment variant according to FIG. 2, the control unit 41 of the grid stabilization device 40 is not connected to the remote converter 20 via a communication line 100, but rather only via the DC transmission link 10. In the embodiment variant according to FIG. 2, the control signal ST(±dP, ±dI) of the remote converter 20 is therefore transmitted via the DC transmission link 10, preferably in the form of a modulated high-frequency data signal.

Figure 3:
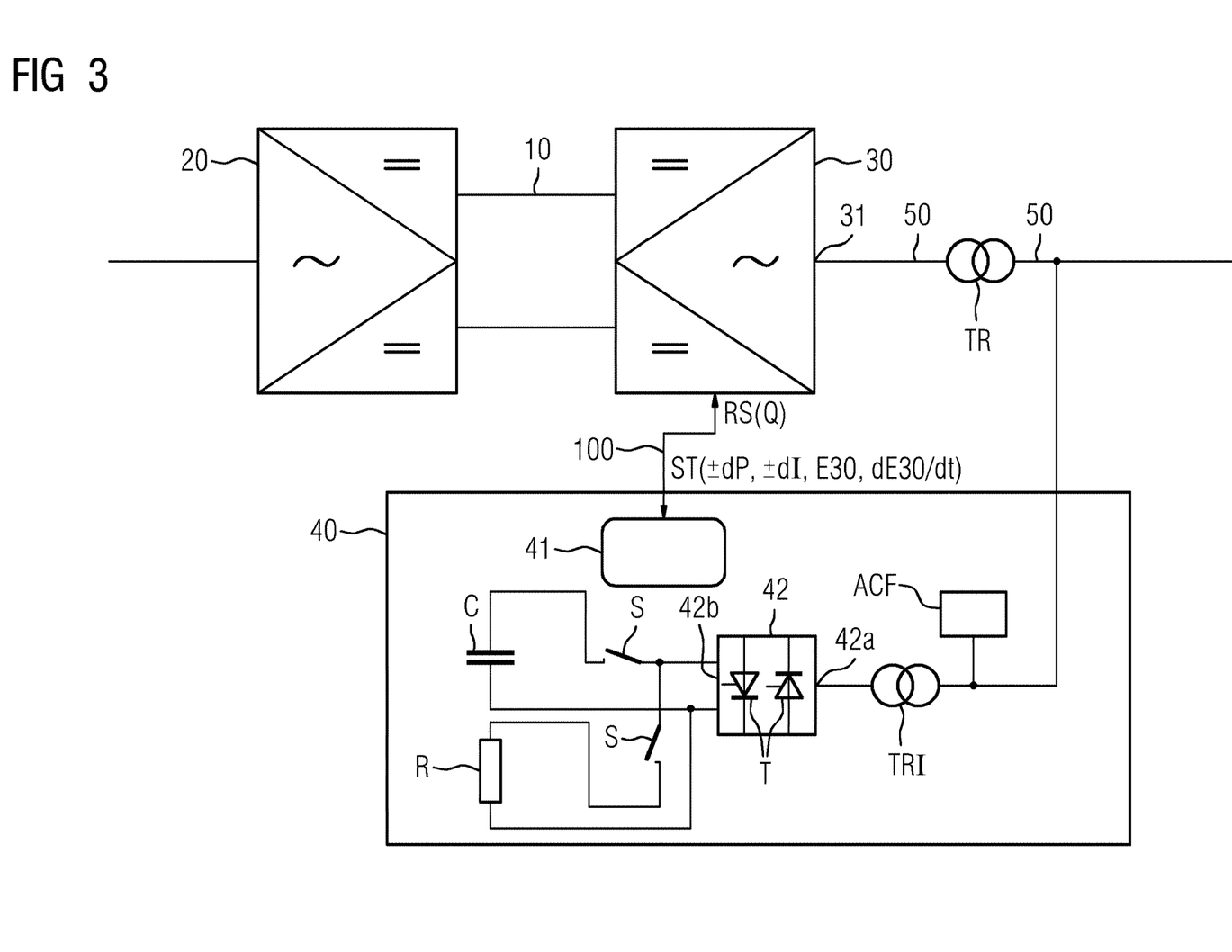

FIG. 3 shows a further embodiment variant of the exemplary embodiment according to FIG. 1. In the embodiment variant according to FIG. 3, the control unit 41 of the grid stabilization device 40 is not connected to the remote converter 20, but rather is connected to the near converter 30 via a communication line 100 and receives from the near converter 30 a control signal ST (±dP, ±dI), which the control unit 41 evaluates during the control of its components and for the purpose of grid stabilization of the AC voltage grid 50.

In the event of an increase +dP or +dI in the effective power supplied by the remote converter 20 or in the direct current supplied by the remote converter 20 into the DC transmission link 10, the near converter 30 transmits a control signal ST to the grid stabilization device 40, with which the increase is indicated and the increase is quantified by indicating an absolute increase value indicating the increase and/or by indicating a power to be taken up by the grid stabilization device. The grid stabilization device 40, after having received this control signal, draws power from the AC voltage grid 50 connected to the near converter 30 for the purpose of grid stabilization.

In the event of a decrease −dP in the effective power supplied by the remote converter 30 or in the direct current supplied by the remote converter 30 into the DC transmission link or the DC transmission grid, the near converter 30 preferably transmits a control signal ST to the grid stabilization device, with which the decrease is indicated and the decrease is quantified by indicating an absolute decrease value indicating the decrease and/or by indicating a power to be supplied by the grid stabilization device. The grid stabilization device 40, after having received this control signal, supplies power into the AC voltage grid 50 connected to the near converter 30 for the purpose of grid stabilization.

It is particularly advantageous when the near converter 30 includes at least one standalone energy store and, for example, is a VSC (voltage source converter) or a multilevel power converter. In this case, the control signal ST, which is transmitted from the near converter 30 to the grid stabilization device, preferably also transmits the energy E30 stored in the energy store and/or the change dE30/dt in the energy E30 stored there with respect to time t.

The grid stabilization device preferably counteracts the change in energy dE30 of the energy E30 stored in the near converter 30 by supplying the required amount of energy into or drawing the required amount of energy from the AC voltage grid 50 connected to the near converter 30.

In the exemplary embodiment according to FIG. 3, it is also advantageous when the grid stabilization device 40 transmits a feedback signal RS to the near converter 30, which indicates the reactive power consumption Q of the grid stabilization device 40. Upon receipt of the feedback signal RS, the near converter 30 will supply the reactive power consumption Q indicated in the feedback signal into the AC voltage grid 50 connected to the near converter 30 and, thus, provide the grid stabilization device with the required reactive power Q via the AC voltage grid 50 or compensate for the withdrawal of the required reactive power Q from the AC voltage grid 50 by the grid stabilization device 40.

Figure 4:
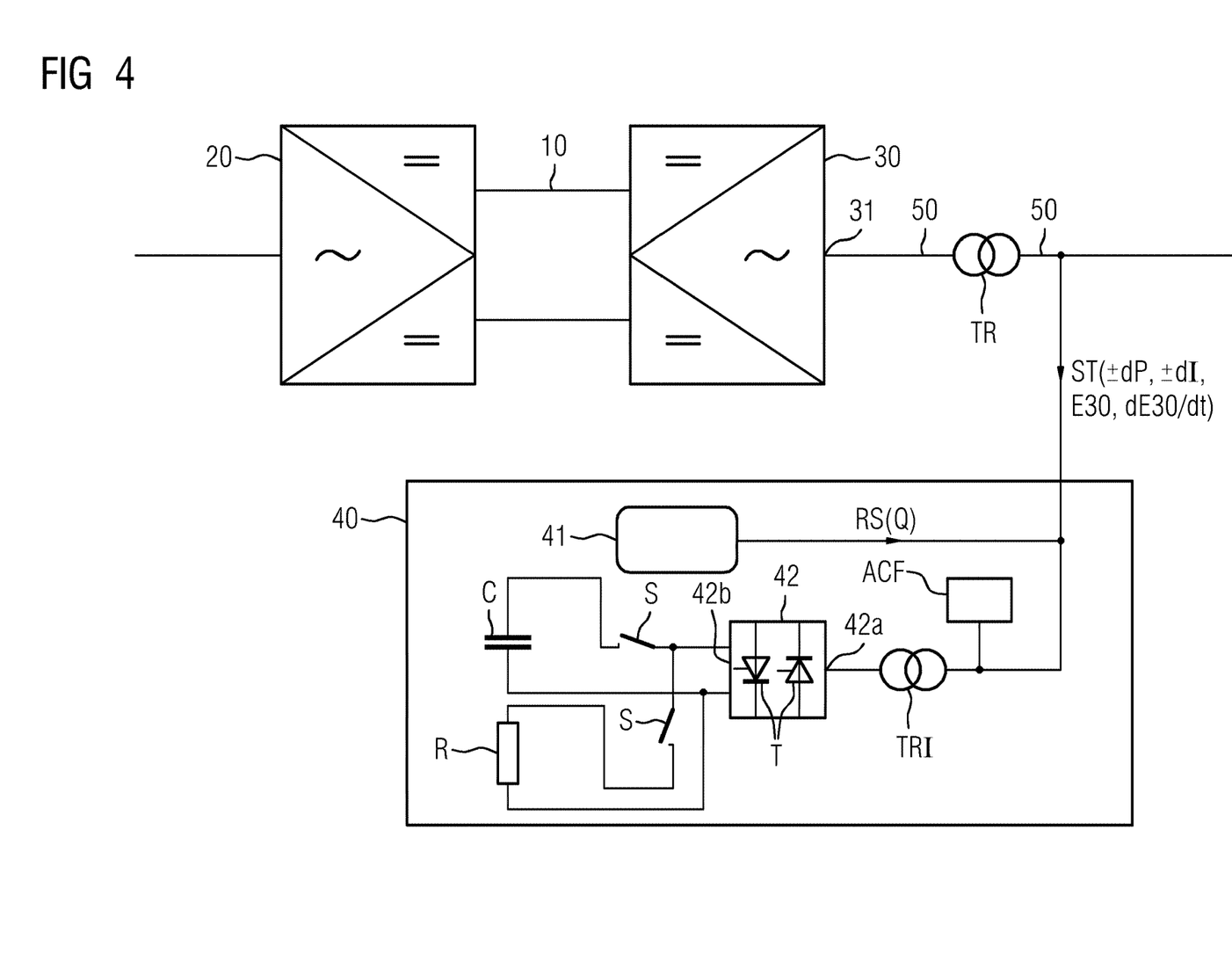

FIG. 4 shows an embodiment variant of the exemplary embodiment according to FIG. 3. In the embodiment variant according to FIG. 4, the control signal ST is not transmitted from the near converter 30 via a separate communication line 100, but rather via the AC voltage side 31 of the near converter 30 or via the AC voltage grid 50. The comments presented above in conjunction with FIG. 3 apply similarly for the rest.

Figure 5:
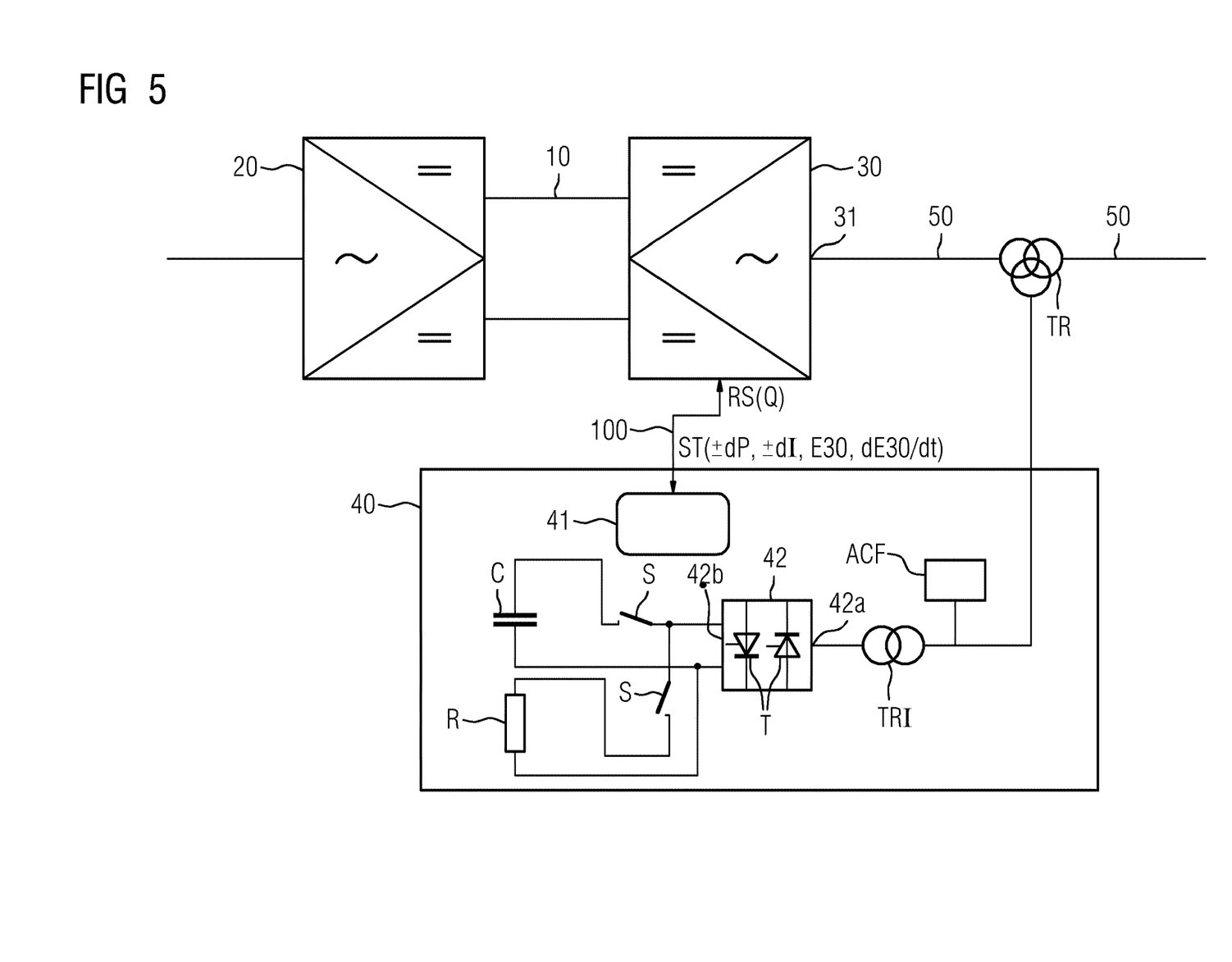

FIG. 5 shows, using the example of the embodiment variant according to FIG. 3, a further advantageous embodiment, in which the transformer TR has three windings and, thus, forms a three-winding transformer. The grid stabilization device 40 is connected to one of the windings of the three-winding transformer TR.

In the exemplary embodiments according to FIGS. 1 through 5, the grid stabilization device 40 is only indirectly connected to the AC voltage side 31 of the near converter 30, since the transistor TR is interposed. Alternatively, it is possible to connect the near converter 30 directly to the grid stabilization device 40.

FIGS. 6 through 9 show further exemplary embodiments of advantageous grid stabilization devices 40, which can be used in the arrangements according to FIGS. 1 through 5.

Figure 6:
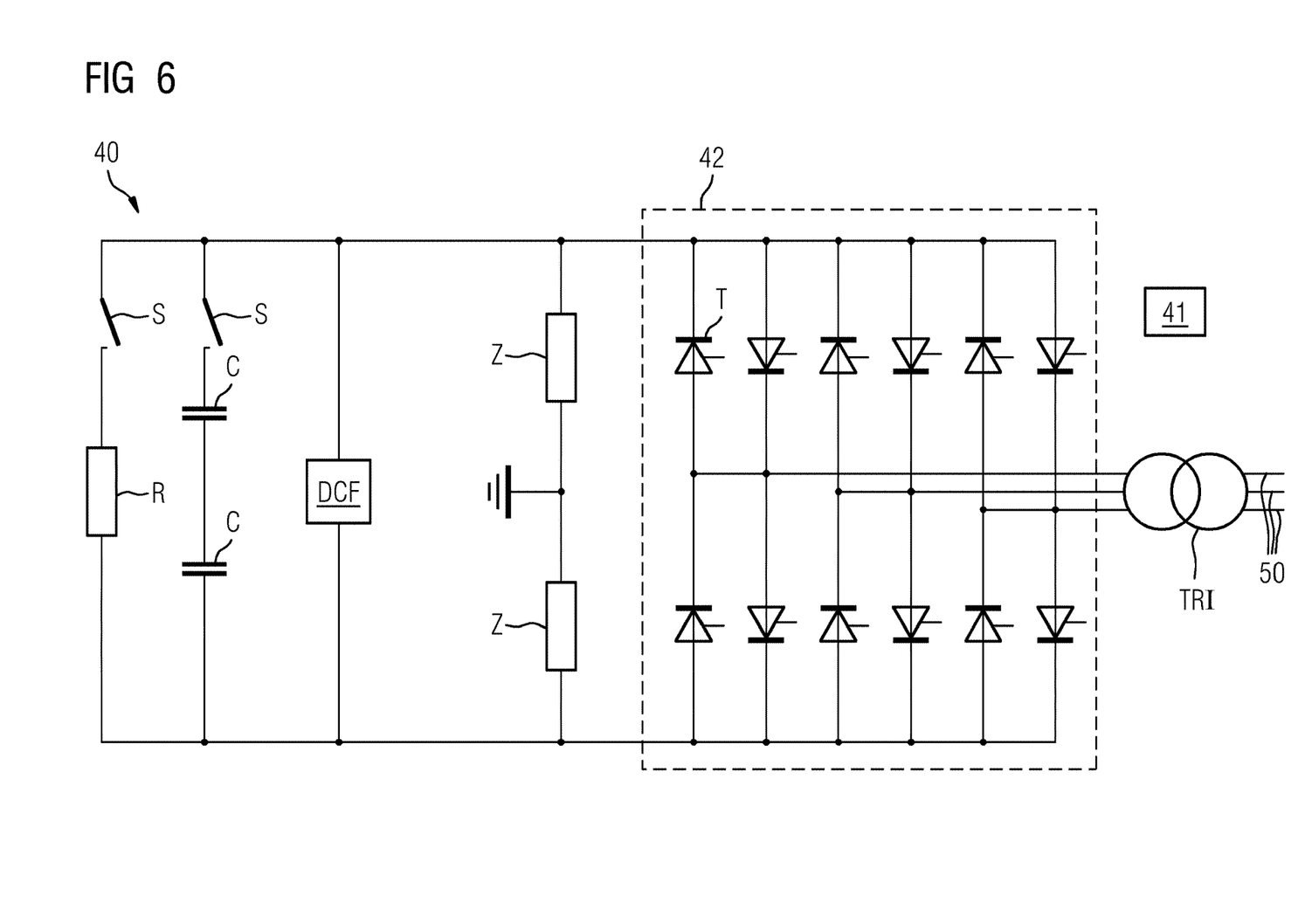
FIGS. 6-10 show exemplary embodiments of advantageous grid stabilization devices, which can be used in the arrangements according to FIGS. 1 through 5.

FIG. 6 shows a grid stabilization device 40 that has twelve thyristors, which are connected to an internal transformer TRI of the grid stabilization device 40 and are activated by the control unit 41. Two impedances Z carry out a potential balancing.

Figure 7:
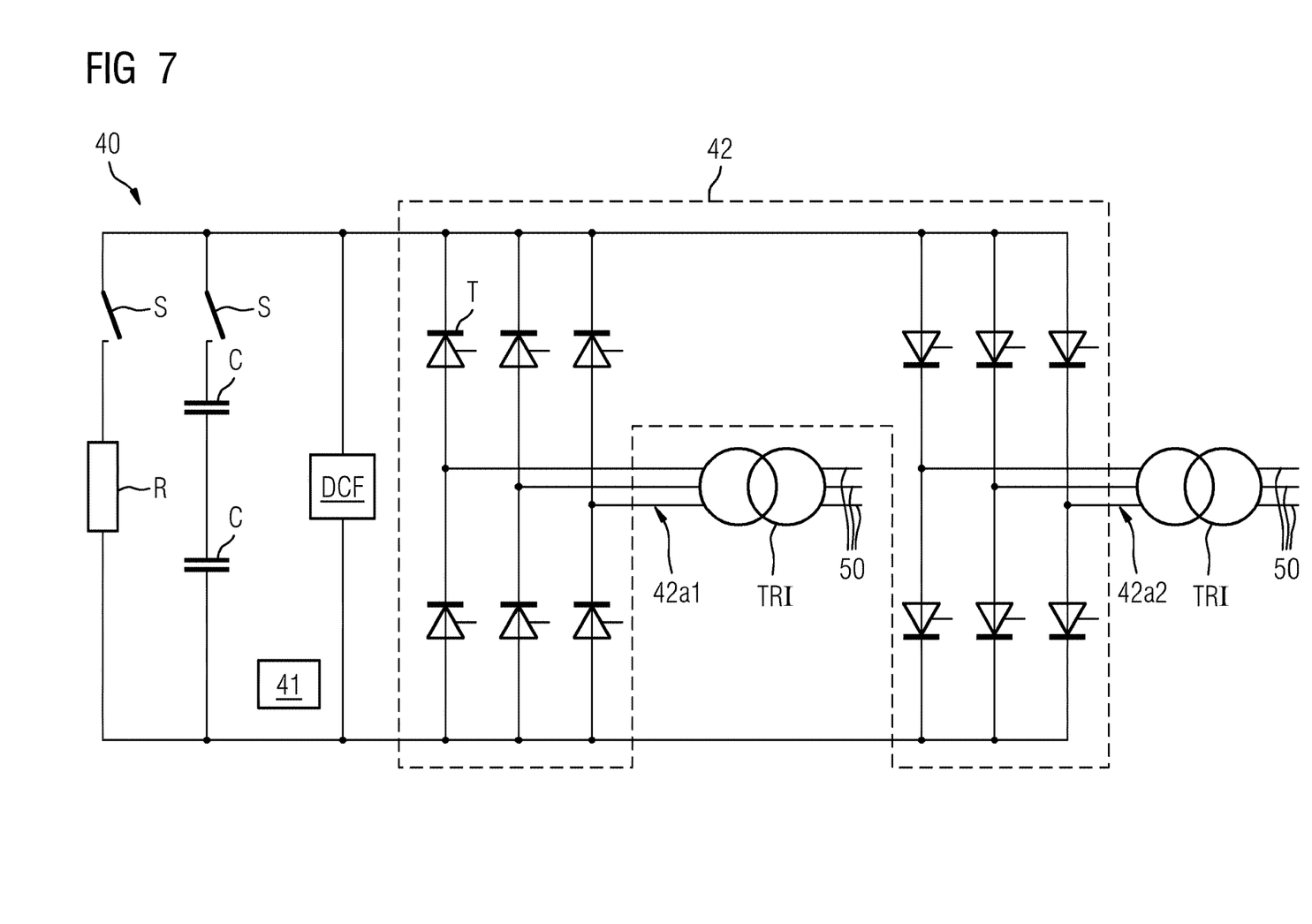

FIG. 7 shows a further grid stabilization device 40 that has twelve thyristors. The grid stabilization device 40 has two three-phase connections 42a1 and 42a2, to each of which an internal transformer TRI of the grid stabilization device 40 is connected.

Figure 8:
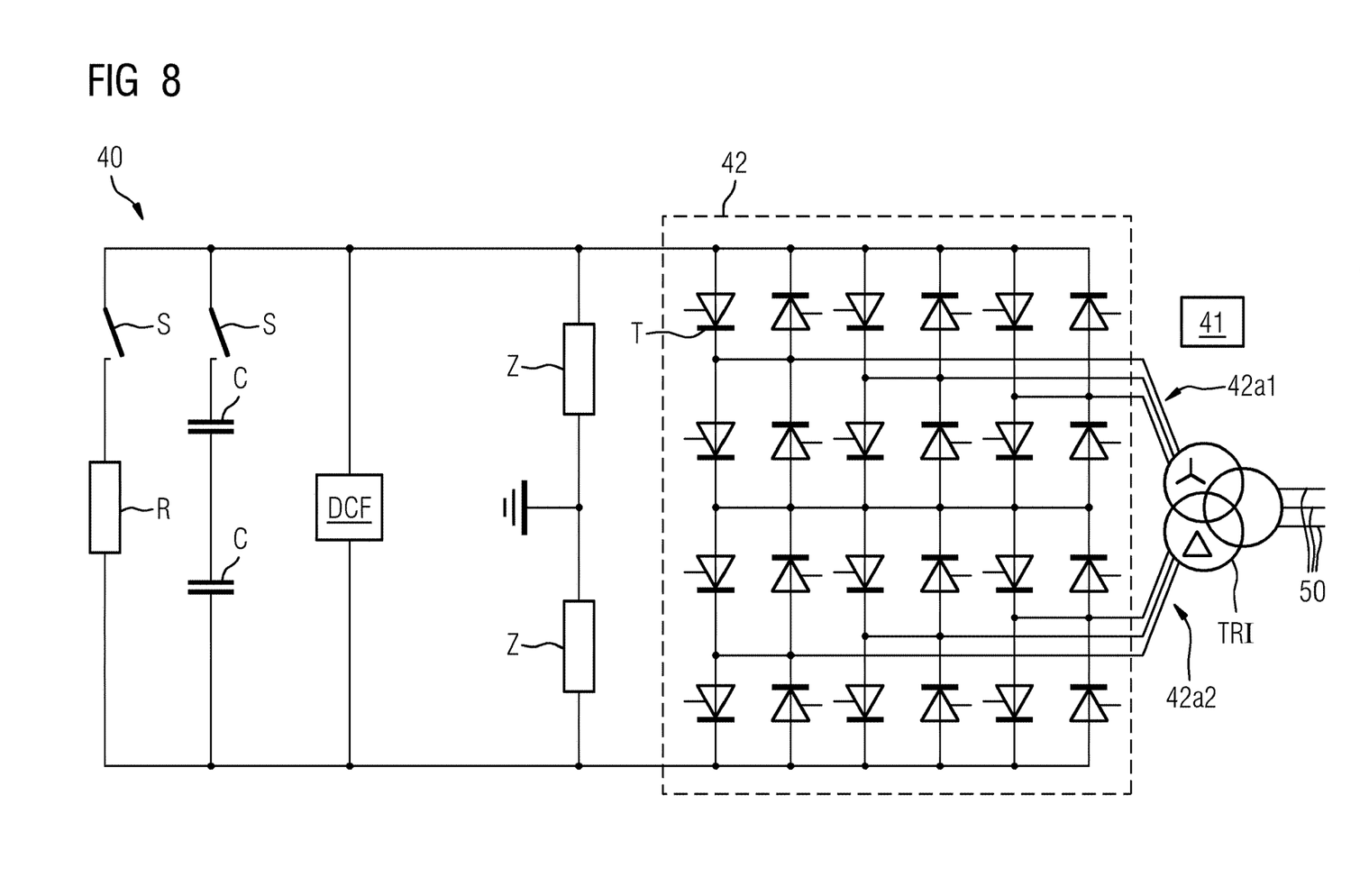

FIG. 8 shows a grid stabilization device 40 that includes twenty-four thyristors. The grid stabilization device 40 has two three-phase connections; a star connection of an internal transformer TRI of the grid stabilization device 40 is connected to one of the connections 42a1 and a delta-star connection of the same internal transformer TRI is connected to the other connection 42a2.

Figure 9:
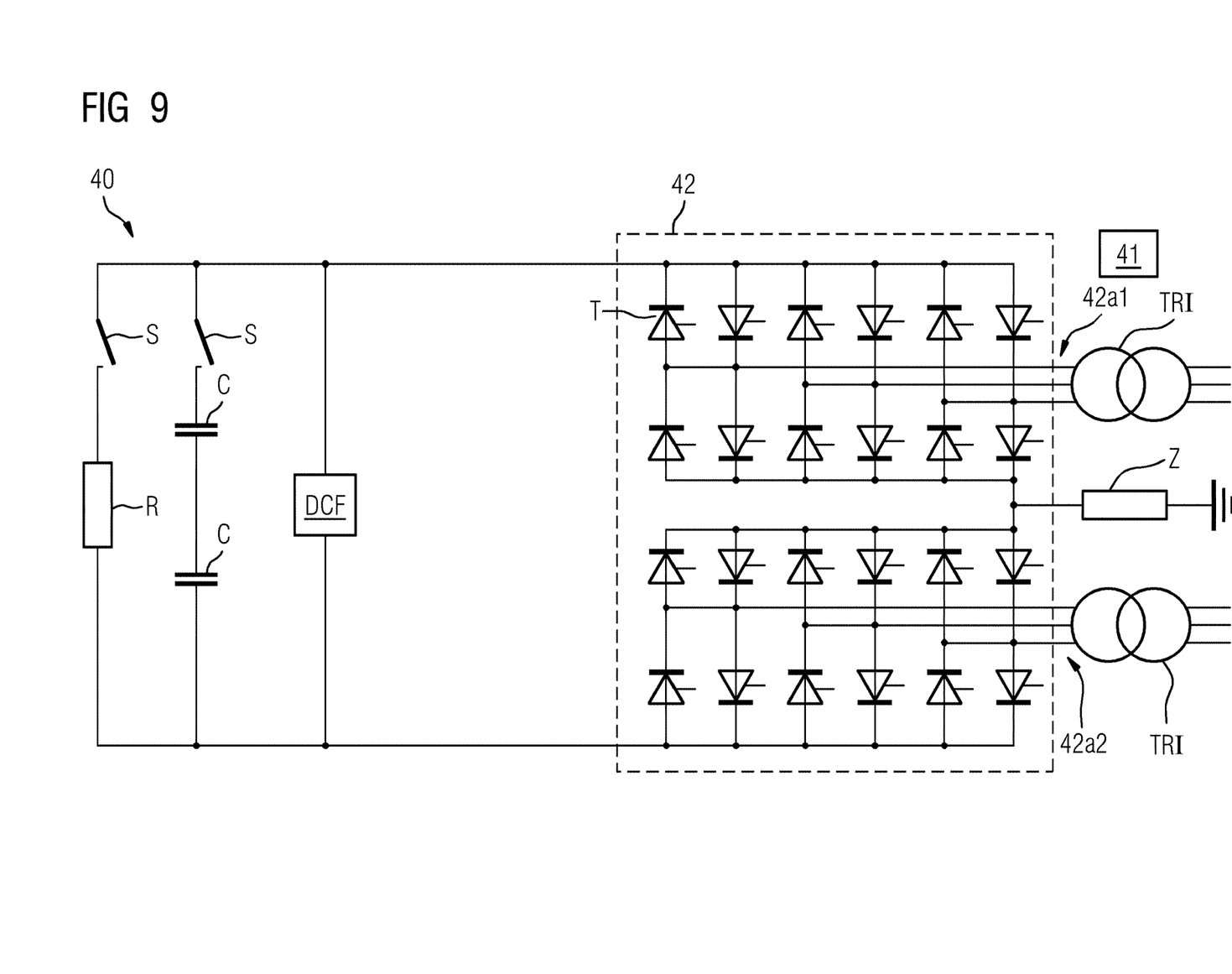

FIG. 9 shows a further grid stabilization device 40 that has twenty-four thyristors. The grid stabilization device 40 has two three-phase connections 42a1 and 42a2, to each of which an internal transformer TRI of the grid stabilization device 40 is connected.

Figure 10:
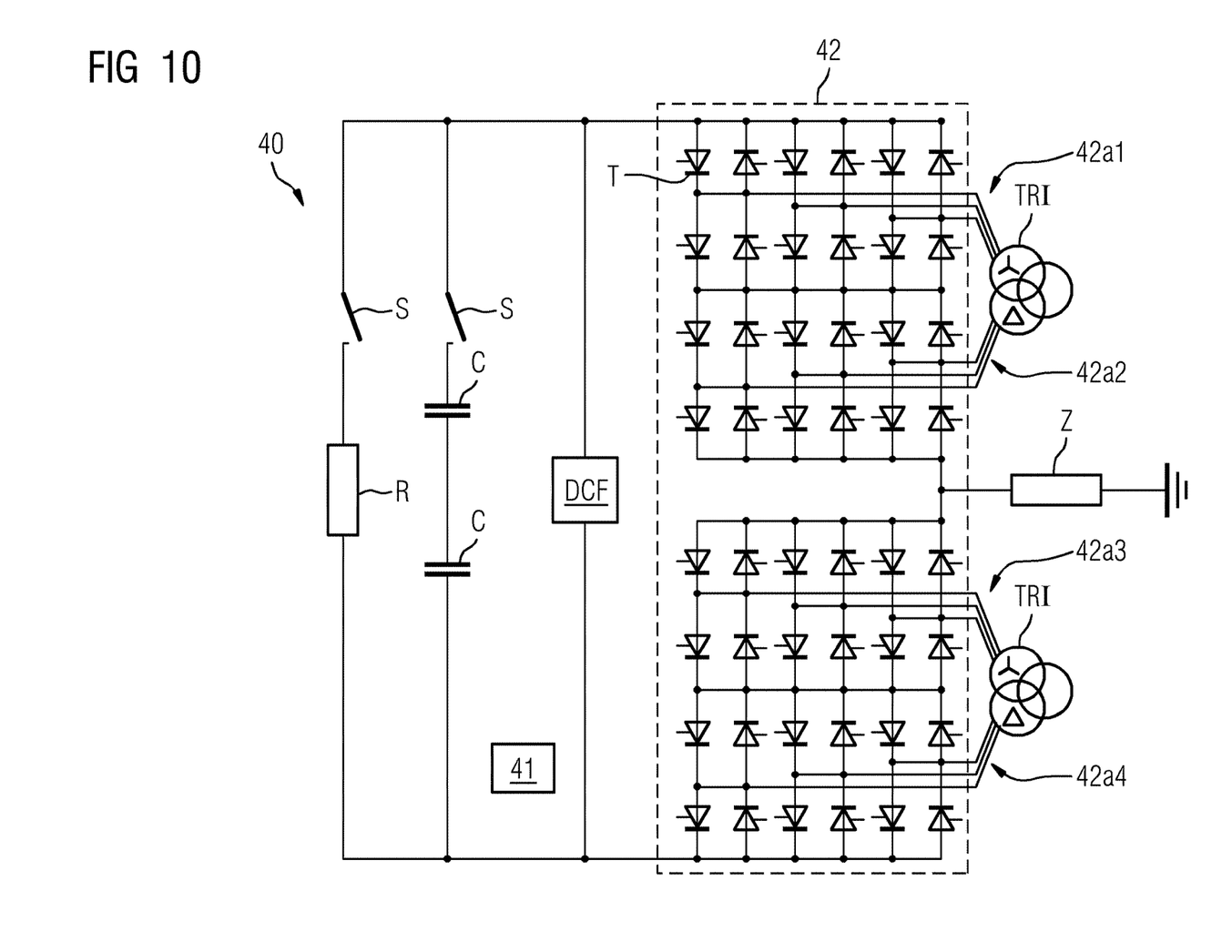

FIG. 10 shows a grid stabilization device 40 that has forty-eight thyristors. The grid stabilization device 40 has four three-phase connections: A star connection of an upper internal transformer TRI in FIG. 10 is connected to a first of the four connections 42a1, a second of the four connections 42a2 is connected to a delta-star connection of the upper transformer TRI. A star connection of a lower internal transformer TRI in FIG. 10 is connected to a third of the four connections 42a3 and a delta-star connection of the lower transformer TRI is connected to a fourth of the four connections 42a4.

Electrical energy stores C and energy consumers R are present in the exemplary embodiments according to FIGS. 1 through 9. If energy is only to be consumed by the grid stabilization device 40, the electrical energy store(s) C can be omitted. If energy is only to be temporarily stored by the grid stabilization device 40, but not consumed, the electrical consumer(s) R can be omitted.

In FIGS. 6 through 9, by way of example, two energy stores in the form of batteries or capacitors are connected in series; alternatively, more or fewer energy stores can be present. The energy stores C can also be interconnected in a way other than that shown. For example, the energy stores C can be connected in parallel.

In FIGS. 6 through 9, the reference signs Z designate impedances for potential balancing; such a potential balancing is advantageous but can be dispensed with depending on the application. In the exemplary embodiments according to FIGS. 6 and 8, two impedances are connected in series for the purpose of balancing. In the exemplary embodiments according to FIGS. 9 and 10, one single impedance Z is provided for balancing.

In FIGS. 6 through 9, the reference sign DCF designates DC voltage filters, which are advantageous but can be omitted depending on the application; the same applies for the filters ACF located on the AC voltage side and shown in FIGS. 1 through 5, which are also advantageous but can also be omitted in FIGS. 1 through 5 depending on the application. The filters ACF shown in FIGS. 1 through 5 can also be additionally provided in the exemplary embodiments according to FIGS. 6 through 9.

In the exemplary embodiments according to FIGS. 1 through 9, the control units 41 are preferably designed in such a way that the control units 41 switch the switches S for switching from the energy storage mode into the energy consumption mode, and vice versa, only in the non-energized state, i.e., when the thyristors T of the rectifier circuit 42 have appropriate operating states. The switches S preferably report their particular switching state to the control unit 41 by means of communication links (not shown).

It is also advantageous when, in the exemplary embodiments according to FIGS. 1 through 9, the control units 41 operate the grid stabilization device 40 in the energy storage mode, provided that the state of charge of the energy stores C is in a predefined operating range. If the state of charge exceeds an upper limit, a switch into the energy consumption mode is preferably carried out, in order to avoid overcharging the energy stores.

The transformers TRI shown in the exemplary embodiments can—as shown—be integral parts of the grid stabilization device 40 or, alternatively, separate transformers on the grid. It is also possible to design arrangements of the described type without transformers.

Although the invention was illustrated and described in greater detail by means of preferred exemplary embodiments, the invention is not limited by the described examples and other variations can be derived by a person skilled in the art without departing from the scope of protection of the invention.

LIST OF REFERENCE SIGNS

10 DC transmission link
20 (remote) converter
30 (near) converter
31 AC voltage side
40 grid stabilization device
41 control unit
42 rectifier circuit
42a grid-side connection side
42a1 three-phase connection
42a2 three-phase connection
42a3 three-phase connection
42a4 three-phase connection
42b internal connection side
50 AC voltage grid
100 communication line
ACF filter
C electrical energy store
DCF DC voltage filter
dE30/dt change in the stored energy
E30 stored energy
I direct current
p effective power
Q reactive power consumption
R energy consumer
RS feedback signal
S switch
ST control signal
t time
T thyristor
TR transformer on the grid
TRI internal transformer
Z impedance
+dI increase in the direct current
+dP increase in the effective power
−dI decrease of the direct current
−dP decrease of the effective power

The invention claimed is:

1. A method for operating a configuration having at least one DC transmission link or at least one DC transmission grid to which at least two converters, each having an AC voltage side and a DC voltage side, are connected, a grid stabilization device is connected indirectly or directly to the AC voltage side of one of the converters, referred to hereinafter as a near converter, the grid stabilization device having for grid stabilization an energy store for a temporary storage of energy and an energy consumer for consuming electrical energy, and the grid stabilization device is separated on a grid side by at least one other of the at least two converters, referred to hereinafter as a remote converter, by way of the near converter, which comprises the steps of:

activating the grid stabilization device by at least one control signal, which is generated and transmitted to the grid stabilization device by the near converter or the remote converter.

2. The method according to claim 1, which further comprises transmitting, via the remote converter, the at least control signal to the grid stabilization device, in an event of an increase in power supplied by the remote converter or a direct current supplied by the remote converter into the at least one DC transmission link or the at least one DC transmission grid, the at least one control signal indicating an increase and/or an increase is quantified thereby, and the grid stabilization device, after having received the at least one control signal, draws the power from an AC voltage grid connected to the near converter.

3. The method according to claim 1, which further comprises transmitting, via the remote converter, the at least one control signal to the grid stabilization device in an event of a decrease in power supplied by the remote converter or a direct current supplied by the remote converter into the at least one DC transmission link or the at least one DC transmission grid, the at least one control signal indicating the decrease and/or the decrease is quantified thereby, and the grid stabilization device, after having received the at least one control signal, supplies the power into an AC voltage grid connected to the near converter.

4. The method according to claim 1, which further comprises transmitting, via the near converter, the at least one control signal to the grid stabilization device in an event of an increase in power supplied by the remote converter or in a direct current supplied by the remote converter into the at least one DC transmission link or the at least one DC transmission grid, the at least one control signal indicates the increase and/or the increase is quantified by indicating an absolute increase value indicating the increase and/or by indicating the power to be taken up by the grid stabilization device, and the grid stabilization device, after having received the at least one control signal, draws power from an AC voltage grid connected to the near converter.

5. The method according to claim 1, which further comprises transmitting, via the near converter, the at least one control signal to the grid stabilization device in an event of a decrease in power supplied by the remote converter or in a direct current supplied by the remote converter into the at least one transmission link or the at least one DC transmission grid, the at least one control signal indicating the decrease and/or the decrease is quantified by indicating an absolute decrease value indicating the decrease and/or by indicating a power to be given off by the grid stabilization device, and the grid stabilization device, after having received the at least one control signal, supplies power into an AC voltage grid connected to the near converter.

6. The method according to claim 1, wherein the near converter has at least one energy store, and the method further comprises:
transmitting the at least one control signal, via the near converter, to the grid stabilization device, in dependence on the energy stored in the energy store and/or on a change in the energy stored there with respect to time.

7. The method according to claim 6, wherein the grid stabilization device counteracts a change in the energy stored in the near converter, by supplying energy into or drawing energy from an AC voltage grid connected to the near converter.

8. The method according to claim 1, wherein:
the grid stabilization device transmits a feedback signal to the near converter, which indicates a reactive power consumption of the grid stabilization device; and
the near converter supplies the reactive power consumption indicated in a feedback signal into an AC voltage grid connected to the near converter and, thus, provides the grid stabilization device with required reactive power via the AC voltage grid.

9. The method according to claim 1, wherein the grid stabilization device has a controller and a rectifier circuit having at least two thyristors, the rectifier circuit being connected with a grid-side connection side to an AC voltage grid and with an internal connection side to the energy store and the energy consumer of the grid stabilization device, which further comprises:
switching-on, via the controller, at least one of the thyristors of the rectifier circuit and switching-off at least one other of the thyristors of the rectifier circuit in order to draw power from the AC voltage grid or to supply power into the AC voltage grid.

10. A configuration, comprising:
at least two converters each having an AC voltage side and a DC voltage side;
at least one DC transmission link or at least one DC transmission grid to which said at least two converters are connected; and
a grid stabilization device connected indirectly or directly to said AC voltage side of one of said at least two converters, referred to hereinafter as a near converter, said grid stabilization device having for grid stabilization an energy store for a temporary storage of energy and an energy consumer for consuming electrical energy, said grid stabilization device being separated on a grid side by at least one other of said at least two converters, hereinafter referred to as a remote converter, by way of said near converter; and
said grid stabilization device being activated by at least one control signal, being generated and transmitted to said grid stabilization device by said near converter or said remote converter.

11. The configuration according to claim 10, wherein said grid stabilization device has:
a rectifier circuit with a grid-side connection side, an internal connection side and at least two thyristors, said rectifier circuit is connected with said grid-side connection side to an AC voltage grid and with said internal connection side to said energy store and said energy consumer of said grid stabilization device; and
a controller configured such that said controller carries out a control of said grid stabilization device by utilizing a converter-side control signal and switches on at least one of said thyristors of said rectifier circuit and leaves at least one other of said thyristors of said rectifier circuit switched off in order to draw power from the AC voltage grid or to supply power into the AC voltage grid.

12. The configuration according to claim 11, further comprising at least one transformer connected between said grid-side connection side of said rectifier circuit and the AC voltage grid.

13. The configuration according to claim 12, wherein said at least one of transformer has a three-phase connection with a neutral earthing and a three-phase connection in a Delta configuration.

14. The configuration according to claim 13, wherein said rectifier circuit includes at least two three-phase connections.

15. The configuration according to claim 14, wherein one of said three-phase connections of said rectifier circuit is connected to said three-phase connection with said neutral earthing of said at least one transformer and another of said three-phase connections of said rectifier circuit is connected to said three-phase connection in said Delta configuration thereof or of another transformer.

* * * * *